Sept. 15, 1970 — A. D. PORTNO — 3,528,889
CONTINUOUS FERMENTATION APPARATUS
Filed March 31, 1967 — 3 Sheets-Sheet 1

United States Patent Office 3,528,889
Patented Sept. 15, 1970

3,528,889
CONTINUOUS FERMENTATION APPARATUS
Antony David Portno, Salfords, near Redhill, England, assignor to Brewing Patents Limited, London, England, a British company
Filed Mar. 31, 1967, Ser. No. 627,363
Claims priority, application Great Britain, Apr. 15, 1966, 16,745/66
Int. Cl. C12b *1/26;* C12c *11/04*
U.S. Cl. 195—135                            1 Claim

ABSTRACT OF THE DISCLOSURE

In a continuous fermentation process the fermentation vessel is provided with a rotor having a liquid outflow passage arranged on its axis so that fermented liquor may be displaced through such passage and the amount of micro-organism carried out in such liquor may be reduced by the centrifugal action of the rotor. The fermented liquor may reach the axial outflow passage through a series of upwardly inclined passages leading from the periphery of the rotor.

---

Figure 1:
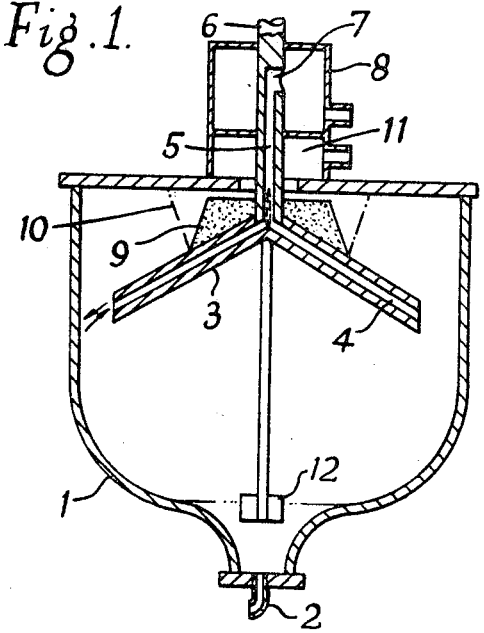

This invention relates to apparatus for the continuous fermentation of fermentable media and is particularly, but not exclusively directed to apparatus for the continuous fermentation of brewers' wort to produce beer.

In arrangement for the continuous production of beer a fermentation vessel, which during operation may be regarded as containing a suspension of yeast in nearly fully fermented wort, is provided with a continuous supply of brewers' wort. It is also provided with an outlet from which is withdrawn a substantially fully fermented liquor. In the case of the earlier vessel or vessels of a multi-vessel fermentation system, or in appropriate circumstances the fermentation vessel may contain a suspension of yeast in partly fermented wort and only partly fermented liquor containing suspended yeast can be withdrawn from such vessel.

In a given unit of time a definite amount of fresh yeast is grown within the fermentation vessel. When the system is operating under steady state conditions, the amount of yeast removed with the liquor must obviously equal the amount of new yeast grown. When operating conditions are altered, for instance in respect of the rate of supply of brewers' wort, the amount of yeast within the vessel, the rate of yeast growth and the rate of yeast removal in the liquor, all assume altered levels.

It is known that a measure of direct control may be attained over the amount of yeast growth in the system by separating the yeast from the liquor as it leaves the fermentation vessel and returning either all or part of the yeast so separated to the fermentation system. Clearly such procedures have disadvantages in that additional pumps and yeast separating devices are required.

Alternatively it is possible to employ fermentation vessels in which a proportion of the yeast is separated from the outflowing liquor by sedimentation as the outflowing liquor passes through a relatively unagitated zone before leaving the fermentation vessel. This expedient, however, also fails to give the full measure of control which is desirable. For instance, the reduction of yeast removal depends upon the natural flocculence of the yeast and with a non-flocculent yeast, which may in other respects be very suitable for the brewing fermentation, the extent of the reduction of yeast removal may fall far short of that desired.

It is an object of the present invention to provide improved means for controlling the rate of removal of yeast from a vessel or vessels in which a continuous fermentation is carried out. In its widest aspects the present invention provides a device which utilises centrifugal force to separate yeast from the liquor flowing out of a fermentation vessel and, since this enables forces many times more powerful than gravity to be applied to separate yeast from the liquor, a very high degree of control of the rate of removal of yeast in the fermented liquor may be exercised, regardless of the flocculation characteristics of the yeast.

Apparatus of the present invention essentially comprises an enclosed fermentation vessel, having a liquid inlet and a liquid outlet comprising a rotor, carried at the lower end of a vertical spindle and having one or more passages leading to a passage extending upwardly in the spindle. The passages in the rotor preferably extend in a direction substantially radially of the rotor. The apparatus of the present invention may be used in a continuous fermentation process for the production of potable beer to control the rate of yeast outflow in the effluent beer down to a very low level and, at least in some cases, it is possible to control the rate of yeast outflow in the effluent beer to an almost negligible quantity.

Figure 2:
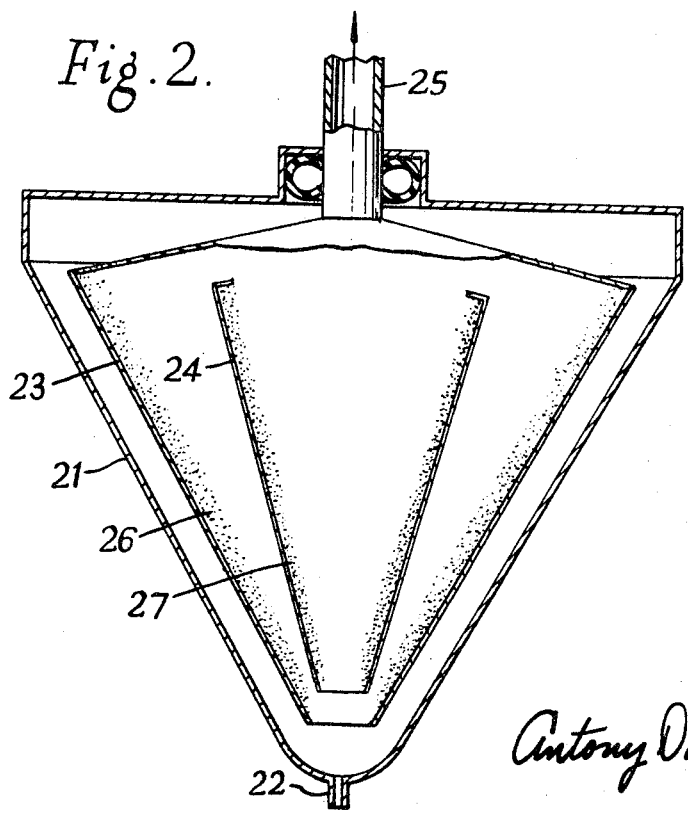
Figure 3:
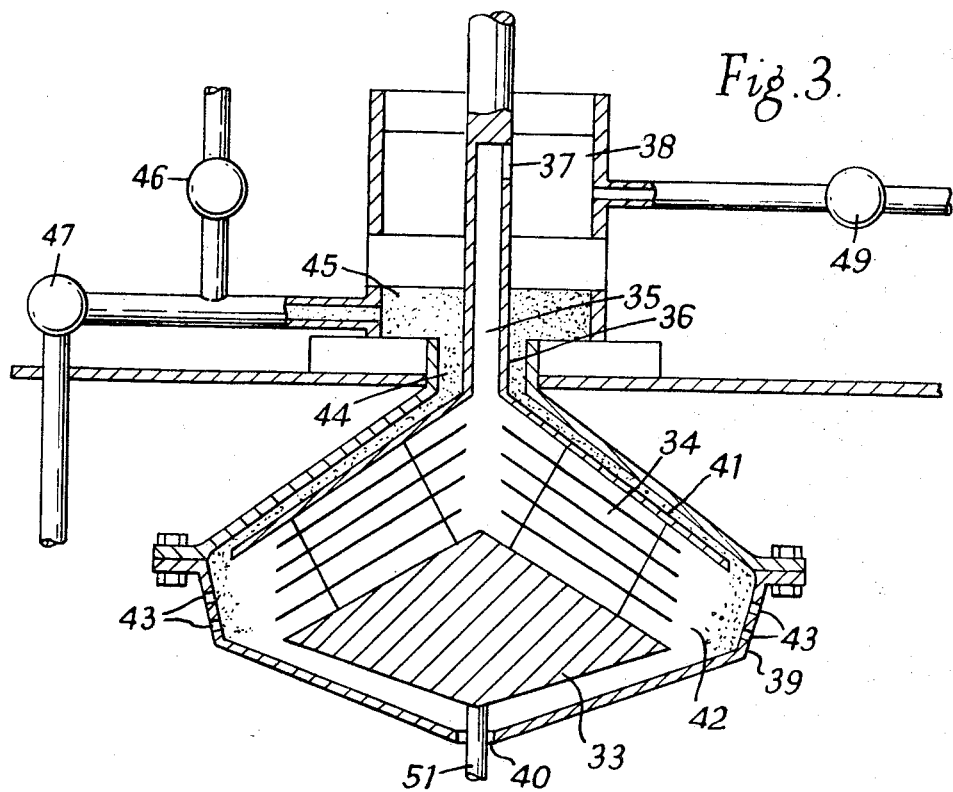
Figure 4:
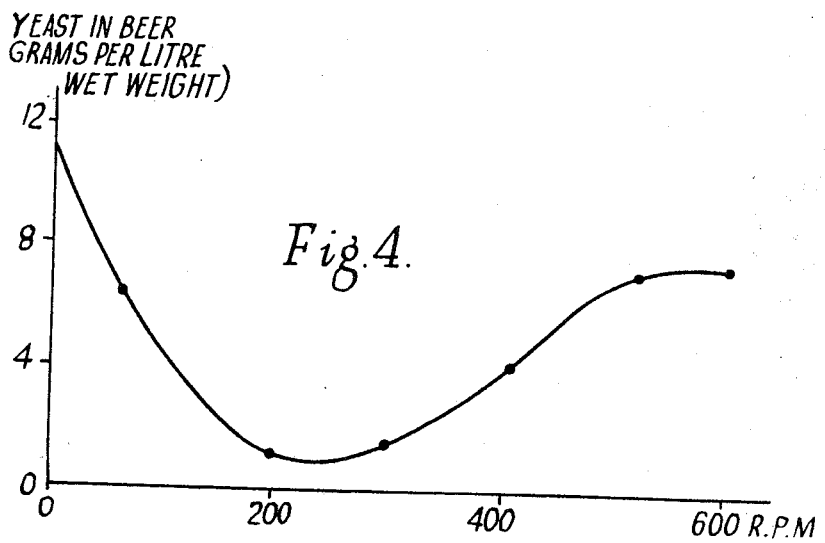
Figure 5:
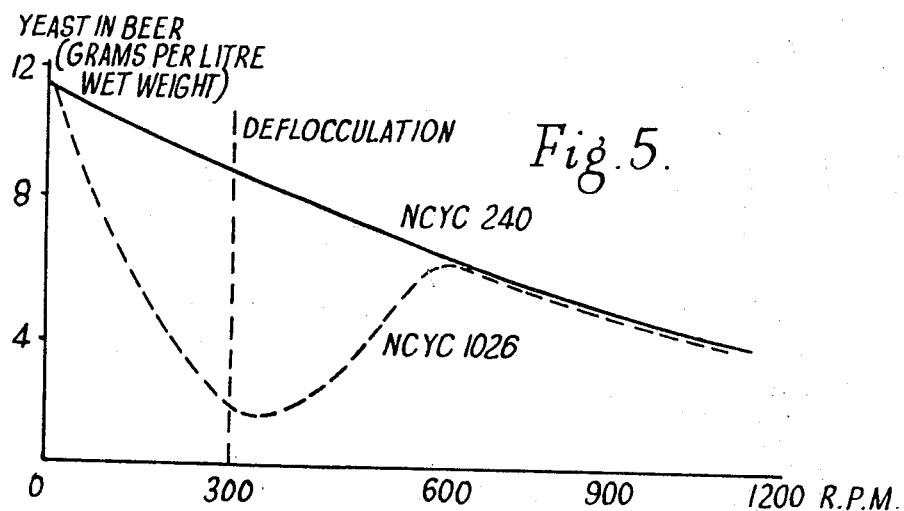

Referring now to the accompanying drawings:

FIG. 1 illustrates a continuous fermentation vessel incorporating means for maintaining a substantially uniform dispersion of yeast in the fermentation liquor and equipped with means for separation of yeast from outflowing liquor and for leading off evolved gas, FIG. 2 illustrates a continuous fermentation vessel incorporating means for maintaining zoned concentration of yeast, FIG. 3 shows an alternative arrangement of rotor for use in the apparatus of FIG. 1, and FIGS. 4 and 5 illustrate yeast outflow rates at different rotor velocities for the apparatus of FIG. 1.

In the apparatus of FIG. 1 wort is continuously introduced into the enclosed fermenter vessel 1 through an inlet 2. Liquor is displaced from the fermenter 1 at a rate equal to the inlet rate through a rotor 3, which has a series of passages 4 radiating from a central point, at which they lead into an axial passage 5 in the hollow spindle 6 through which liquor is displaced and is allowed to flow out of a port 7 into the collector 8. In leaving the fermenter through the rotor, liquor is subjected to centrifugal force dependent upon the speed of rotation and this causes all or part of the suspended yeast to be separated from the outflowing liquid so as to remain in the fermenter. By variation of the speed of rotation of the spindle 6 it is possible to achieve control of the rate of yeast removal in the outflowing liquid to an optimum value, which will be dependent upon the yeast strain.

A paddle 9 is secured above the rotor 3 and produces a vortex, indicated by the dotted lines 10, which enables evolved gas to escape into a gas outlet space 11 without carrying liquor through at the same time. For convenience a stirrer 12 may be carried on a downward extension from the spindle 6. However the stirrer may be quite separate from the rotor 3 and may be mounted on a different spindle, which is not turned at the same speed as the spindle 6.

It is known that to maintain a steady fermentation rate with a given yeast concentration new yeast must be allowed to grow in the fermentation vessel to a certain extent to avoid the progressive deactivation of the yeast. For example, in some cases it is found desirable that a minimum daily growth equal to one-tenth of the total quantity of yeast in the system be allowed. The apparatus of the present invention may be utilised to control the outflow rate of yeast in the liquor to such a value as to permit growth rate of fresh yeast to approximate to this desired minimum value.

An alternative arrangement of rotor is illustrated in

FIG. 3 and is intended to permit the production of beer by continuous fermentation with substantially complete exclusion of yeast from the beer leaving the enclosed fermenter. As in the construction of FIG. 1, the rotor 33 has a series of radially and upwardly extending passages 34, leading to an axial outlet passage 35 in the rotor spindle 36, through which liquor is displaced to flow out of a port 37 into a collector 38. In this case the rotor 33 is enclosed within a stationary shroud 39, having an axial liquid entrance aperature 40, through which a spindle 51, carried by the rotor 36, extends downwardly to a stirrer in the lower portion of the fermentation vessel.

In this construction the rotor 33 is provided with a conical cape portion 41, which is at the top of an annular yeast concentration space 42, lying between the periphery of the rotor 33 and the shroud 39. Yeast becomes concentrated in this space by the rejection action of the rotor 33. Such yeast may be passed back into the fermentation vessel through a series of apertures 43 in the wall of the shroud 39. Preferably, however, yeast is displaced in the form of a cream through a passage 44 into a space 45, from which the whole or a part of the yeast may be discharged under the control of a valve 46. Another part of the yeast may be returned to the fermenter under the control of a valve 47. The necessity of controlling the relative proportions of yeast offtake and yeast return to fermenter by means of valves 46 and 47 makes it desirable to provide a control valve 49 on the liquor outflow from the collector 38 to permit sufficient restriction to be placed on such outflow to permit displacement of the yeast to take place.

In this case a separate gas outlet must be provided. This may take the form of a separate vortex-producing paddle, arranged to operate in the same manner as the paddle 9 illustrated in FIG. 1.

The fermentation vessel system of the present invention can clearly be employed in other types of industrial fermentation, such as the production of penicillin.

EXAMPLE 1

As an example of the operation of the apparatus of FIG. 1 a continuous fermenter incorporating an integral centrifugal yeast outlet control system similar to that described and illustrated was operated for a period of four weeks. During the first week sterile hopped wort, specific gravity 1040, was pumped through the vessel (capacity 800 mls.) until the yeast concentration had reached 580 grams per litre (wet weight). This point was reached after 5 days at which time a steady state was reached. After this point wort was pumped into the formenter at a rate of 12 litres per day (24 hours). This represents a daily production of beer equal to 15 times the volume of the fermentation vessel. The beer produced had a specific gravity of 1010.5 and was normal in all respects.

During such a trial the performance of the yeast control system was demonstrated in the following manner. It was found that at a speed of 450 r.p.m no yeast escaped from the fermenter. At a speed of 300 r.p.m. the outflowing beer contained $2.4 \times 10^6$ cells per ml. and at a speed of 185 r.p.m. the beer contained $3.4 \times 10^7$ cells per ml. It was, however, found that a minimum rate of yeast outflow of $3 \times 10^7$ cells per ml. was required to maintain the activity of the yeast at the flow rate quoted.

EXAMPLE 2

During this trial, when a flocculent yeast (British National Collection of Yeast Cultures No. 1026) was used the performance of the yeast control system was demonstrated and FIG. 4 shows the concentrations of yeast which escaped at a range of rotor speeds between 0 and 600 r.p.m. It can be seen that the escape of yeast was at a minimum at a speed of 250 r.p.m., at which the centrifugal force at the periphery of the rotor was 7G.

FIG. 5 shows how the increasing speed of rotation causes the yeast to deflocculate and above a speed of 700 r.p.m. the yeast is effectively in a unicellular condition and control of its retention follows the curve shown for a powdery yeast (British National Collection of Yeast Cultures No. 240).

EXAMPLE 3

As an example of the use of this invention to produce continuously a beer of high quality over a prolonged period the apparatus was operated using a flocculent yeast (British National Collection of Yeast Cultures No. 1026) and a constant rotor speed of 200 r.p.m., at which the concentration of yeast which escaped in the beer was 9.5% of that held within the fermentation vessel, the concentration of yeast in the fermentation vessel being approximately 220 grams per litre (wet weight).

Over a period of several weeks a beer of high quality was obtained at an efficiency of 6 and it was noted that the operation of the system under these conditions resulted in a significant improvement in the utilisation of hop bitter substances and reduced the proportion which is normally lost by absorption on the yeast during the fermentation process. During this trial a wort of specific gravity 1040 was used and the specific gravity of the finished beer was 1008. In this and following Examples, efficiency is expressed as the number of volumes of beer obtained per day relative to the volume of the fermenting wort present in the fermentation vessel.

EXAMPLE 4

The apparatus of the present invention is also capable of operation with worts of different gravities than that previously described. During a trial, in which wort of specific gravity 1050 was used, the yeast concentration in the fermentation vessel was maintained at 380 grams per litre (wet weight) and this enabled beer of specific gravity 1012 to be produced continuously over a period of several weeks. During this time it was found necessary to allow a concentration of yeast equivalent to 14% of the internal concentration (about 27 grams/litre) to escape in the beer in order to ensure a rate of yeast growth within the system sufficient to maintain the yeast in an actively fermenting state.

EXAMPLE 5

The apparatus of the present invention is also capable of operation with types of yeast other than those referred to in previous examples and which comprised various strains of *Saccharomyces cerevisiae*; it is thus useful with strains of yeast normally used in the production of lager beers. As an example, a strain of *Saccharomyces carlsbergensis* (British National Collection of Yeast Cultures No. 687) was used. The conditions were similar to those described in Example 3, although due to the less flocculent nature of the yeast a rotor speed of 600 r.p.m. was used in order to generate a centrifugal force of 16G at the rotor periphery. Under these conditions a satisfactory beer was produced for a period of several weeks. The yeast concentration in the fermentation vessel was 180 grams per litre (wet weight) and the outflowing beer contained a concentration of yeast equivalent to 8% of this concentration.

The control of yeast concentration both within the fermenting vessel and in the outflowing liquor may be achieved by the zoned concentration of yeast within the fermentation vessel. In this method the whole body of liquor in the fermenter vessel is turned about the central axis so that the yeast is held in a concentration zone adjacent the periphery of the vessel or the periphery of a rotor turning in the vessel so as to hold the concentration of yeast in a zone around the central axis at a low value, the fermented liquor being removed at a point on the axis as before. The efficiency of this system is increased by the provision of internal horizontal baffle plates which direct the incoming wort, entering the bottom of the vessel, towards the zone of maximum yeast concentration around the periphery of the vessel.

A further development of this system is illustrated in FIG. 2. In this construction the fermentation vessel 21 is generally conical in shape and unfermented wort is introduced through an inlet 22. In the vessel there are two conical rotors 23, 24, open at their upper ends and supported on spiders from a spindle 25, which is hollow to provide an exit passage for liquor and gas. In this arrangement careful selection of the rotor velocity can lead to maintenance of even zones of yeast concentration indicated at 26, 27 in which a high yeast concentration is retained and in these zones fermentation proceeds at a rapid rate, whilst the yeast concentration in the region of the liquor flow through spindle 25 is quite low. The fermentation vessel of FIG. 2 can also be constructed, employing a cylindrical vessel and one or more concentric cylindrical rotors.

A fermentation vessel as shown in FIG. 2 has been employed to ferment wort of specific gravity 1.040 to beer of specific gravity 1.010 at efficiencies up to 11, using the term "efficiency" in the same sense as it was employed before. In this type of fermenter total retention of yeast can normally be achieved at speeds of less than 600 r.p.m. with a rotor of 7 ins, diameter, this type of system not being subject to the mechanical deflocculation of yeast.

I claim:
1. Apparatus for conducting a continuous fermentation operation comprising an enclosed fermentation vessel, an inlet at the bottom of the vessel for fresh liquor, an outlet for fermented liquor at the top of the vessel and arranged on the axis of rotation of a rotor carried at the lower end of a vertical hollow spindle, siad rotor having a plurality of passages extending radially and downwardly from the outlet passage in the vertical hollow spindle to a position adjacent to the inner wall of the vessel, a paddle carried by the spindle and situated between the rotor and the top of the fermentation vessel for the production of a vortex space in which fermentation gas may collect, and a gas outlet in the top of the fermentation vessel communicating with the vortex space.

References Cited
UNITED STATES PATENTS

| | | | |
|---|---|---|---|
| 2,731,331 | 1/1956 | Strezynski | 195—135 |
| 2,997,424 | 8/1961 | Mayer | 195—143 |

ALVIN E. TANENHOLTZ, Primary Examiner

U.S. Cl. X.R.

99—31, 275; 195—115, 143